(12) United States Patent
Lee

(10) Patent No.: US 6,364,339 B1
(45) Date of Patent: Apr. 2, 2002

(54) TRAILER HITCH AND LOCK ASSEMBLY

(76) Inventor: Lih Shya Lee, 7F, No. 46, Pin Ho 10 Street, Chang Hua (TW), 500

( * ) Notice: Subject to any disclaimer, the term of this patent is extended or adjusted under 35 U.S.C. 154(b) by 0 days.

(21) Appl. No.: 09/693,700

(22) Filed: Oct. 17, 2000

(51) Int. Cl.[7] .................................................. B60D 1/01
(52) U.S. Cl. ........................ 280/507; 70/14; 70/34
(58) Field of Search .......................... 280/507, 515; 70/34, 31, 32, 14, 258, 20, 33, 42, 350, 35, 38 R, 38 B

(56) References Cited

U.S. PATENT DOCUMENTS

| | | | |
|---|---|---|---|
| 1,783,905 A | * 12/1930 | Copell | 70/32 |
| 1,895,655 A | * 1/1933 | Fraim | |
| 4,440,005 A | * 4/1984 | Bulle | 70/34 |
| 4,576,021 A | * 3/1986 | Holden | 70/34 |
| 4,811,578 A | * 3/1989 | Masoncup et al. | 70/38 B |
| 4,844,498 A | * 7/1989 | Kerins et al. | 280/507 |
| 5,540,065 A | * 7/1996 | Wyers | 70/34 |
| 5,794,959 A | 8/1998 | Scheef, Jr. | 280/400 |
| 5,857,692 A | 1/1999 | Hayes et al. | 280/410 |
| 6,055,832 A | * 5/2000 | Wyers | 70/34 |

FOREIGN PATENT DOCUMENTS

| | | | | |
|---|---|---|---|---|
| IT | 284201 | * | 8/1981 | 70/34 |
| SU | 855168 | * | 8/1981 | 70/31 |

OTHER PUBLICATIONS

Sales Document entitled "Coupler Locks, Jacks", see fig. entitled Wild Bill Hitch Lock, Jun. 1989.*

* cited by examiner

*Primary Examiner*—Daniel G. DePumpo

(57) ABSTRACT

A hitch and lock device for coupling a trailer to a vehicle includes a lock rod engaged through the elements from the vehicle and the trailer, and a lock device engaged with the lock rod to secure the elements together. The lock device may be quickly engaged onto the lock rod to lock the lock rod to the elements and to solidly secure the trailer to the vehicle. The lock device includes a latch slidably received in a housing, and a spring biasing the latch to engage with the lock rod, and an actuator actuated by a core with a key to disengage the latch from the rod against the spring.

1 Claim, 4 Drawing Sheets

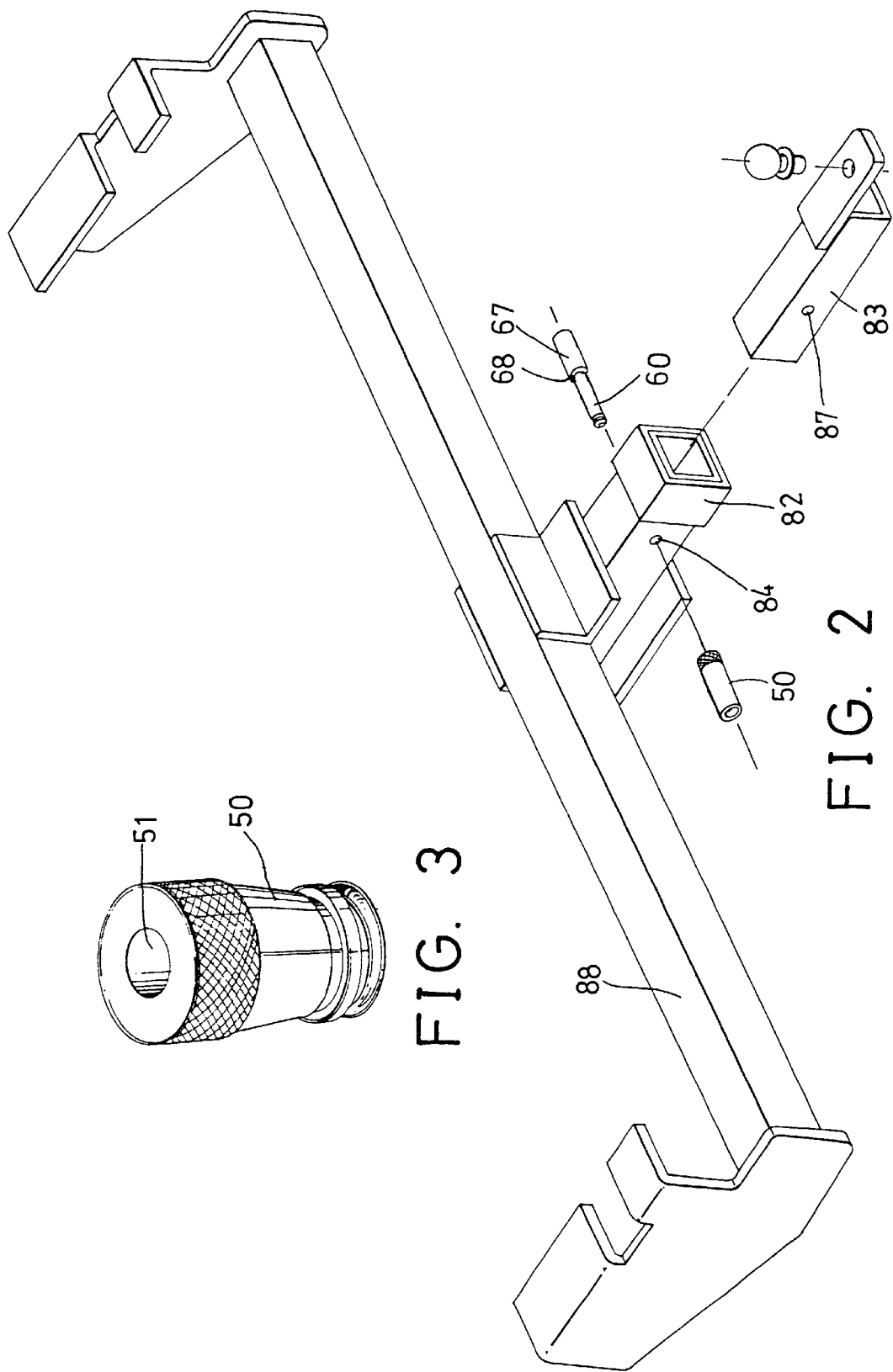

TRAILER HITCH AND LOCK ASSEMBLY

BACKGROUND OF THE INVENTION

1. Field of the Invention

The present invention relates to a hitch device, and more particularly to a trailer hitch and lock assembly.

2. Description of the Prior Art

Typical carts, golf cars, trailers are required to be attached to or coupled to the vehicle with a hitch assembly. U.S. Pat. No. 5,794,959 to Scheef, Jr. discloses a complicated hitch assembly for coupling a trailer to a vehicle and for supporting a wheeled vehicle on the trailer. However, a pin is the only element provided for engaging through the elements from the trailer and the vehicle such that the pin may not be used to solidly lock the trailer to the vehicle.

U.S. Pat. No. 5,857,692 to Hayes et al. discloses a towing apparatus for coupling a golf car to a vehicle or for towing the golf car. A number of bolts are required to be provided and engaged through the elements from the trailer and the vehicle. It takes a long time to thread and unthread the bolts and/or nuts. Some locking pins are engaged through the bolts or nuts for solidly securing or for locking the bolts and nuts together. It may further take time to release the nuts from the bolts. The trailer may not be easily and quickly disengaged or released from the vehicle.

The present invention has arisen to mitigate and/or obviate the afore-described disadvantages of the conventional trailer hitch assemblies.

SUMMARY OF THE INVENTION

The primary objective of the present invention is to provide a trailer hitch and lock assembly for quickly coupling and locking a car or a cart or a trailer to a vehicle.

In accordance with one aspect of the invention, there is provided a trailer hitch and lock assembly for coupling a trailer to a vehicle, the assembly comprising a first element, such as a tube for attaching to or extended from the vehicle, a second element, such as a beam for attaching to or extended from the trailer and for engaging into the tube of the vehicle, a lock rod engaged through the first element and the second element, and a lock device engaged with the lock rod to secure and to lock the first element and the second element together.

The lock device includes a housing, a latch slidably received in the housing, means for biasing the latch to engage with the lock rod, and means for selectively disengaging the latch from the lock rod. The housing includes a notch formed therein for receiving the latch and for allowing the latch to be disengaged from the lock rod.

The lock device includes a casing secured in the housing and having a channel formed therein for slidably receiving the latch. The latch includes a cavity formed therein, the casing includes a depression formed therein, the biasing means includes a spring received in the cavity of the latch and the depression of the casing and engaged with the latch.

The selectively disengaging means includes a core, and an actuator secured to the core and rotated in concert with the core, for allowing the actuator to be rotated by the core to engage with the latch and to disengage the latch from the lock rod. The core includes a non-circular projection, the actuator includes a non-circular aperture formed therein for receiving the projection and for allowing the actuator to be rotated in concert with and to be rotated by the core. The core may be rotatably received in the casing.

The lock rod includes an inclined peripheral surface formed therein for engaging with the latch and for moving the latch against the biasing means when the lock rod is engaged into the housing. The lock rod includes a groove formed therein for receiving the latch and for locking the lock rod to the housing with the latch.

Further objectives and advantages of the present invention will become apparent from a careful reading of a detailed description provided hereinbelow, with appropriate reference to accompanying drawings.

BRIEF DESCRIPTION OF THE DRAWINGS

FIG. 2 is a partial exploded view illustrating the coupling of the elements from the trailer and the vehicle with the trailer hitch and lock assembly;

FIG. 3 is an upper perspective view of a housing of the trailer hitch and lock assembly;

DETAILED DESCRIPTION OF THE PREFERRED EMBODIMENT

Figure 1:
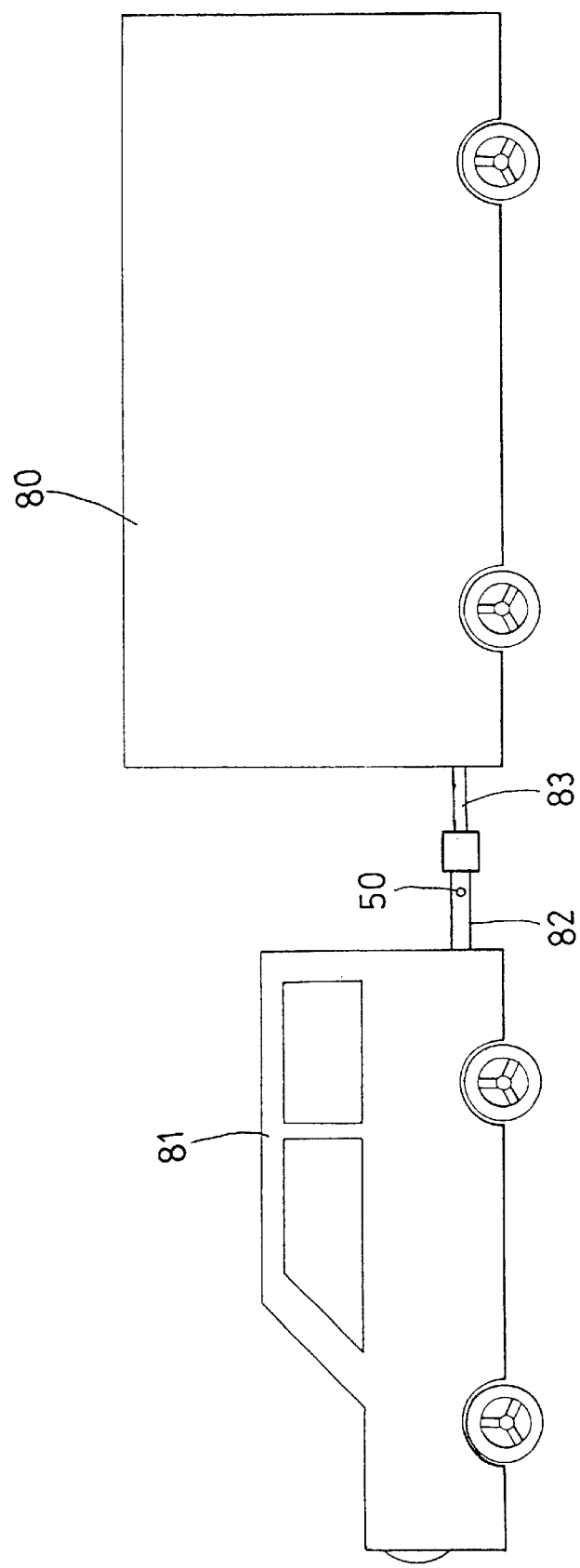
FIG. 1 is a plane schematic view illustrating a trailer coupled to a vehicle with a trailer hitch and lock assembly in accordance with the present invention.
Figures 4, 5, 6, 7:
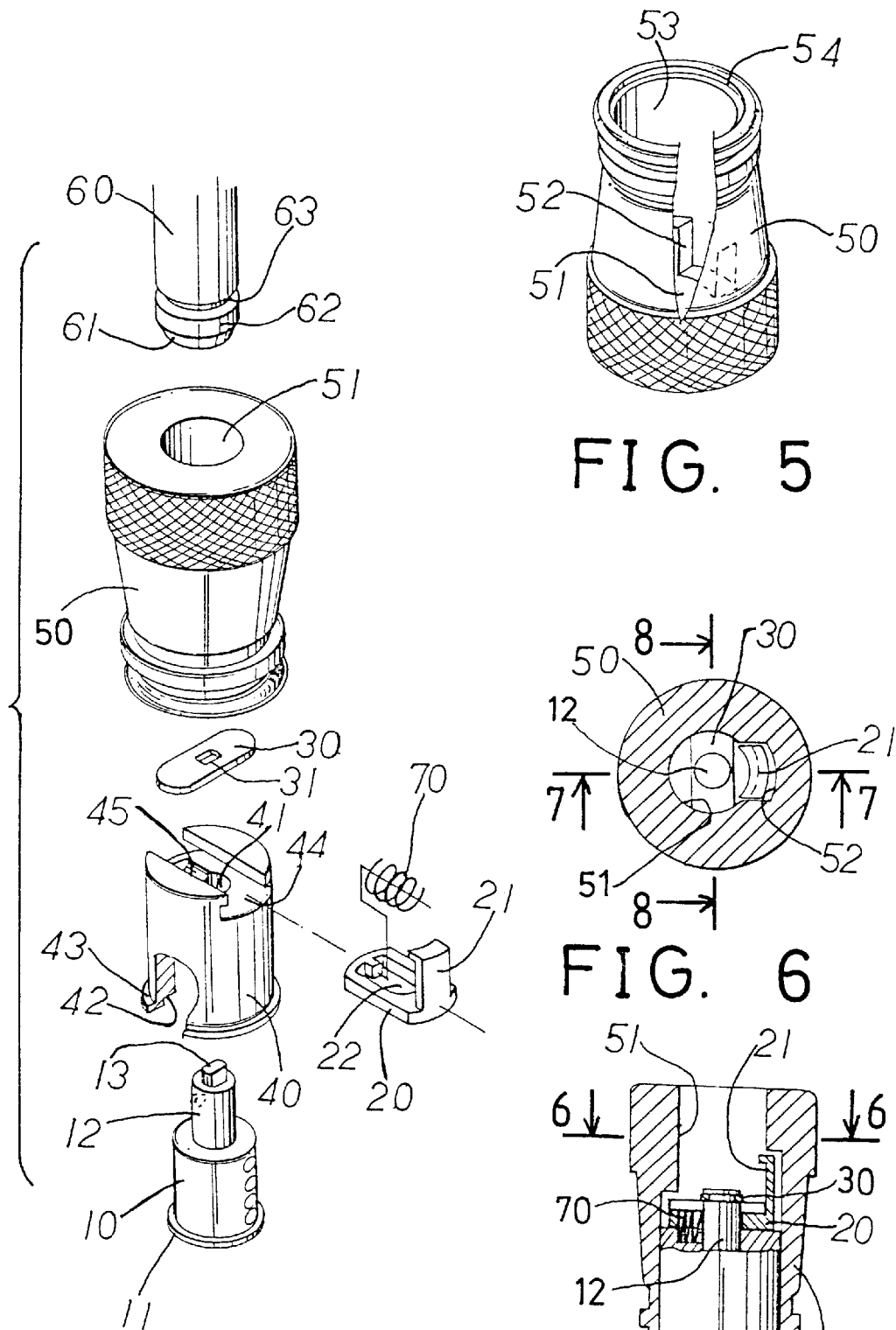
FIG. 4 is an exploded view of the trailer hitch and lock assembly.
FIG. 5 is a bottom perspective view of the housing of the trailer hitch and lock assembly.
FIG. 6 is a cross sectional view taken along lines 6—6 of FIG. 7.
FIGS. 7 and 8 are cross sectional views taken along lines 7—7 and 8—8 of FIG. 6 respectively.

Referring to the drawings, and initially to FIGS. 1–3, a trailer hitch and lock assembly in accordance with the present invention is provided for coupling a a car or a cart or a trailer 80 to a vehicle 81. The vehicle 81 includes an element, such as a tube 82 extended therefrom and having a hole 84 formed therein. The trailer 80 includes an element such as a beam 83 extended therefrom for engaging into the tube 82 and having a hole 87 formed therein for aligning with the hole 84 of the tube 82. The trailer hitch and lock assembly comprises a lock rod 60 engaged through the holes 84, 87 of the tube 82 and the beam 83, and a lock housing 50 engaged with the lock rod 60 for quickly securing and locking the trailer 80 to the vehicle 81. The lock rod 60 may include a head 67 of a greater diameter than that of the rod 60 for defining or forming a peripheral shoulder 68 between the rod 60 and the head 67 and for engaging with the tube 82. The head 67 may be partially engaged into the tube 82 and partially extended outward of the tube 82. The trailer hitch and lock assembly may further includes a bracket or a frame 88 for attaching or securing to the vehicle 81 and for supporting the tube 82.

Referring next to FIGS. 4–8, the lock housing 50 includes a bore 51 formed therein for receiving the lock rod 60 and includes a chamber 53 formed therein and having an inner diameter greater than that of the bore 51 thereof for receiving a lock casing 40 therein. The housing 50 includes a notch 52 formed therein and communicating with the bore 51 and the chamber 53 thereof, and includes a peripheral shoulder 54 formed therein and communicating with the chamber 53 of the housing 50. The casing 40 includes a peripheral flange 43 extended radially outward from one end thereof for engaging into the peripheral shoulder 54 of the housing 50, and includes a peripheral shoulder 42 formed therein. The casing 40 may be welded and solidly secured to the housing 50. The casing 40 includes a channel 44 formed in the other end thereof and includes an orifice 41 and a depression 45 formed in the other end thereof and communicating with the channel 44.

Figures 8, 9, 10:
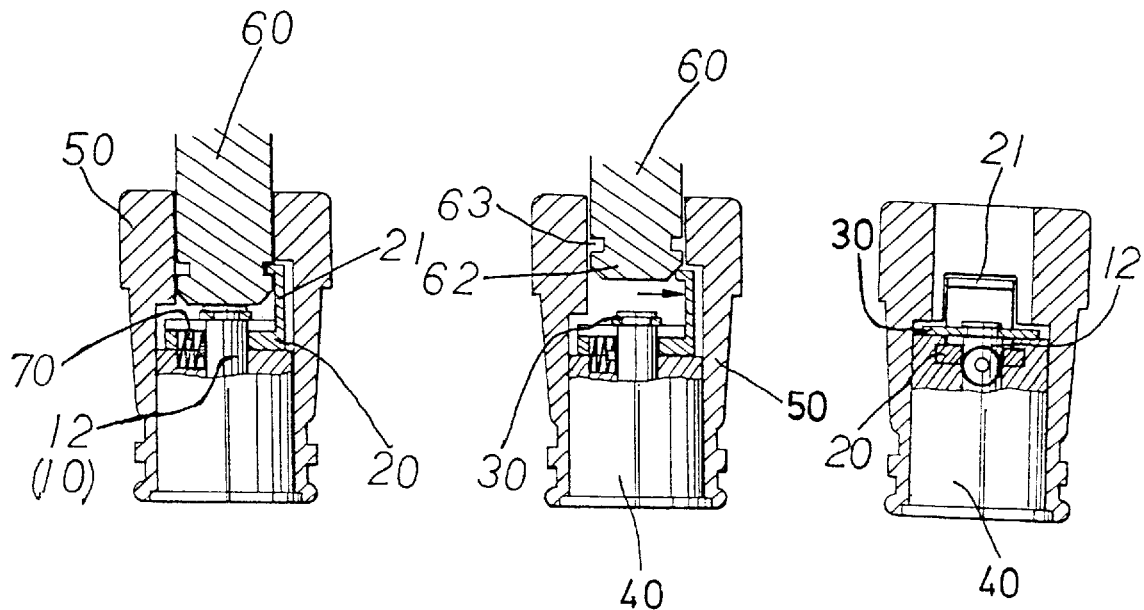
FIGS. 9, 10, 11 are cross sectional views similar to FIG. 7, illustrating the operation of the trailer hitch and lock assembly.
Figures 11, 12:
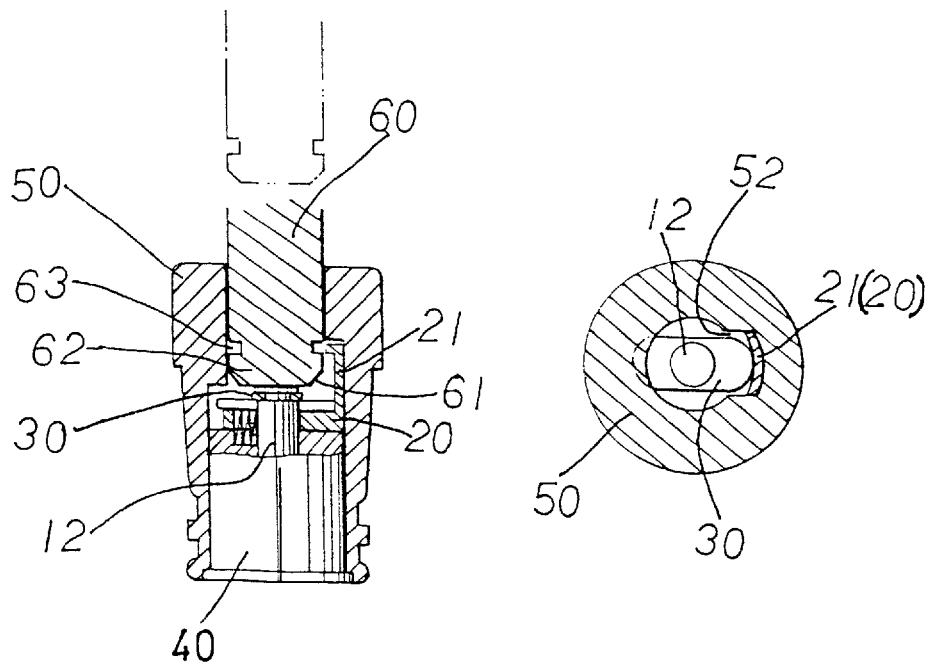
FIG. 12 is a cross sectional view similar to FIG. 6, illustrating the operation of the trailer hitch and lock assembly.

A latch 20 is slidably received in the channel 44 of the casing 40 and includes a cavity 22 formed therein for receiving a spring 70 which is partially received in the depression 45 of the casing 40. The cavity 22 of the latch 20 is aligned with the orifice 41 of the casing 40. The lock rod 60 includes an inclined peripheral surface or a frustum-shaped surface 61 formed in one end 62 thereof and includes a groove, or a peripheral groove 63 formed in the end 62 thereof. The latch 20 includes a pawl 21 extended therefrom and slidably received in the notch 52 of the lock housing 50 and biased by the spring 70 to engage with the groove 63 of the rod 60 (FIG. 10). The pawl 21 may be disengaged from the rod 60 when the pawl 21 is received in the notch 52 of the housing 50 (FIG. 11).

A core 10 is rotatably received in the casing 40 and includes a peripheral rib 11 extended radially outward therefrom for engaging into the peripheral shoulder 42 of the casing 40, and includes an extension 12 extended therefrom and extended through the orifice 41 of the casing 40 and the cavity 22 of the latch 20, and includes a projection 13 extended from the extension 12. An actuator 30 includes an aperture 31 for receiving the projection 13 of the core 10. The actuator 30 may be riveted to or welded to the core 10 with the projection 13. The projection 13 and the aperture 31 of the actuator 30 include a mating non-circular cross section such that the actuator 30 may be solidly secured to the core 10 and rotated in concert with the core 10. The actuator 30 preferably includes a length close to or equal to or slightly smaller than the outer diameter of the casing 40 and may be rotated by the core 10 to actuate or to force the latch 21 into the notch 52 of the housing 50 and to disengage the latch 21 from the lock rod 60 (FIGS. 11, 12).

In operation, as shown in FIGS. 9 and 10, the inclined peripheral surface 61 of the lock rod 60 may facilitate the engagement of the rod 60 into the bore 51 of the housing 50 and may move the latch 21 into the notch 52 of the housing 50 against the spring 70 such that the latch 21 may be easily engaged into the groove 63 of the rod 60 and may easily and quickly lock the rod 60 to the housing 50 without engaging a key to the core 10. As shown in FIGS. 11 and 12, when the extension 12 of the core 10 is rotated by a key that is engaged into the core 10, the actuator 30 may be rotated to move and to force the latch 21 into the notch 52 of the housing 50 and to disengage the latch 21 from the rod 60 such that the rod 60 may be released and disengaged from the housing 50.

The lock rod 60 may thus be easily and quickly engaged to and locked to the housing 50 without a key, and may be easily and quickly disengaged from the housing 50 without threading and unthreading the bolts and without disengaging a lock pin to release the lock nuts from the lock bolts.

Accordingly, the trailer hitch and lock assembly in accordance with the present invention may be used for quickly coupling and locking a car or a cart or a trailer to a vehicle.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A trailer hitch and lock assembly for coupling a trailer to a vehicle, said assembly comprising:
   a) a first element for attaching to the vehicle,
   b) a second element for attaching to the trailer,
   c) a lock rod engaged through said first element and said second element, said lock rod including a groove formed therein, and
   d) a lock device engaged with said lock rod to secure and to lock said first element and said second element together, said lock device including:
      i) a housing including a notch formed therein,
      ii) a latch slidably received in said housing, and slidably receivable in said notch of said housing, said latch including a cavity formed therein, said groove of said lock rod being provided for receiving said latch and for locking said lock rod to said housing with said latch,
      iii) a casing secured in said housing and having a channel formed therein for slidably receiving said latch, said casing including a depression formed therein,
      iv) means for biasing said latch to engage with said lock rod, said biasing means including a spring received in said cavity of said latch and said depression of said casing and engaged with said latch, and
      v) means for selectively disengaging said latch from said lock rod, said selectively disengaging means including a core having an extension extended through said cavity of said latch, and an actuator secured to said extension of said core and rotated in concert with said core, for allowing said actuator to be rotated by said core to engage with said latch and to disengage said latch from said lock rod,
   said latch being receivable in said notch of said housing for allowing said latch to be disengaged from said lock rod.

* * * * *

UNITED STATES PATENT AND TRADEMARK OFFICE
CERTIFICATE OF CORRECTION

PATENT NO. : 6,364,339 B1
DATED : April 2, 2002
INVENTOR(S) : Lee

It is certified that error appears in the above-identified patent and that said Letters Patent is hereby corrected as shown below:

<u>Title page,</u>
Item [*] Notice, delete the phrase "by 0 days" and insert -- by 66 days --

Signed and Sealed this

Eleventh Day of May, 2004

JON W. DUDAS
*Acting Director of the United States Patent and Trademark Office*